United States Patent
Wandler et al.

(10) Patent No.: US 11,418,446 B2
(45) Date of Patent: Aug. 16, 2022

(54) TECHNOLOGIES FOR CONGESTION CONTROL FOR IP-ROUTABLE RDMA OVER CONVERGED ETHERNET

(71) Applicant: Intel Corporation, Santa Clara, CA (US)

(72) Inventors: Shaun Wandler, Austin, TX (US); Kenneth Keels, Austin, TX (US); Matthew Akers, Cedar Park, TX (US)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 16/142,322

(22) Filed: Sep. 26, 2018

(65) Prior Publication Data

US 2019/0044861 A1    Feb. 7, 2019

(51) Int. Cl.
*H04L 47/12* (2022.01)
*H04L 69/22* (2022.01)
(Continued)

(52) U.S. Cl.
CPC ............ *H04L 47/12* (2013.01); *G06F 15/167* (2013.01); *H04L 45/66* (2013.01); *H04L 47/115* (2013.01); *H04L 47/27* (2013.01); *H04L 69/16* (2013.01); *H04L 69/22* (2013.01); *H04L 69/164* (2013.01); *H04L 69/325* (2013.01); *H04L 69/326* (2013.01)

(58) Field of Classification Search
CPC ....... H04L 47/12; H04L 45/66; H04L 47/115; H04L 47/27; H04L 69/16; H04L 69/22; H04L 69/164; H04L 69/325; H04L 69/326; G06F 15/167; G06F 15/17331
See application file for complete search history.

(56) References Cited

U.S. PATENT DOCUMENTS 9,270,489 B1 * 2/2016 Wells ................... H04L 12/56
2012/0287944 A1 * 11/2012 Pandit .................. G06F 13/28
370/474
(Continued)

OTHER PUBLICATIONS

"DCQCN+: Taming Large-scale Incast Congestion in RDMA over Ethernet Networks"; Gao et al.; 2018 IEEE 26th International Conference on Network Protocols; Sep. 25, 2018 (Year: 2018).*
(Continued)

*Primary Examiner* — Benjamin H Elliott, IV
(74) *Attorney, Agent, or Firm* — Compass IP Law PC

(57) ABSTRACT

Technologies for remote direct memory access (RDMA) congestion control include a requester device and a responder device in communication over an Ethernet network. The requester device sends routable RDMA packets to the responder device over the Ethernet network. The packets may be RDMA over Converged Ethernet version 2 (RoCEv2) packets. The responder device determines whether any of the received packets have been marked by the network with a congestion encountered codepoint. If so, the responder device sends an acknowledgment packet with an express congestion notification bit set in the RDMA base transport header. The requester device updates a congestion window as a function of a number of congested packets acknowledged and a total number of packets acknowledged. Those operations may be performed by a network controller of each of the requester device and the responder device. Other embodiments are described and claimed.

23 Claims, 7 Drawing Sheets

(51) Int. Cl.
*H04L 45/00* (2022.01)
*H04L 47/27* (2022.01)
*G06F 15/167* (2006.01)
*H04L 69/16* (2022.01)
*H04L 47/11* (2022.01)
*H04L 69/326* (2022.01)
*H04L 69/325* (2022.01)
*H04L 69/164* (2022.01)

(56) References Cited

U.S. PATENT DOCUMENTS

| | | | | |
|---|---|---|---|---|
| 2012/0311063 | A1* | 12/2012 | Sharp | G06F 13/385 709/212 |
| 2014/0164471 | A1* | 6/2014 | Keels | H04L 69/12 709/201 |
| 2015/0026286 | A1* | 1/2015 | Sharp | G06F 15/167 709/212 |
| 2015/0032835 | A1* | 1/2015 | Sharp | G06F 15/17331 709/212 |
| 2015/0341273 | A1* | 11/2015 | Naouri | H04L 47/822 370/231 |
| 2016/0026604 | A1* | 1/2016 | Pandit | G06F 15/17331 709/212 |
| 2016/0267053 | A1* | 9/2016 | Sharp | G06F 3/0644 |
| 2017/0019803 | A1* | 1/2017 | Nguyen | H04L 47/193 |
| 2018/0048569 | A1* | 2/2018 | Sajeepa | H04L 69/325 |
| 2018/0198715 | A1* | 7/2018 | Shmilovici | H04L 45/74 |
| 2019/0044861 | A1* | 2/2019 | Wandler | H04L 47/27 |
| 2019/0116126 | A1* | 4/2019 | Shen | H04L 47/263 |
| 2020/0084150 | A1* | 3/2020 | Burstein | H04L 67/1097 |
| 2020/0177513 | A1* | 6/2020 | Zhang | H04L 47/263 |

OTHER PUBLICATIONS

"Congestion Control for Large-Scale RDMA Deployments"; Zhu et al.; SIGCOMM '15; Aug. 17, 2015 (Year: 2015).*

Request for Comments 3168 (RFC 3168), "The Addition of Explicit Congestion Notification (ECN) to IP"; Ramakrishnan et al.; Sep. 2001. (Year: 2001).*

Bensley et al., "Request for Comments: 8257, Data Center TCP (DCTCP): TCP Congestion Control for Data Centers", ISSN: 2070-1720, Oct. 2017, 17 pages.

European Office Action for Patent Application No. 19183485.2, dated Aug. 26, 2021, 6 pages.

Extended European search report for European patent application No. 19183485.2, dated Nov. 25, 2019 (8 pages).

Yuanwei Lu+ et al: "MuUi-Path Transport for ROMA in Datacenters", USENIX, USENIX, The Advanced Computing Systems Association, Apr. 9, 2018 (Apr. 9, 2018), pp. 364-378, retrieved from the Internet: URL:https://www.usenix.org/sites/default/files/nsdi18_full_proceedings_interior.pdf [retrieved on Apr. 9, 2018].

Chen W Sun Huawei Technologies F: "Problem Statement of RoCEv2 Congestion Management," Internet Engineering Task Force. IETF; Standardworkingdraft, Internet Society (ISOC) 4, Rue Des Falaises CH-1205, Aug. 10, 2018 (Aug. 10, 2018), pp. 1-9, [retrieved on Aug. 10, 2018].

* cited by examiner

TECHNOLOGIES FOR CONGESTION CONTROL FOR IP-ROUTABLE RDMA OVER CONVERGED ETHERNET

BACKGROUND

The transmission control protocol (TCP) network protocol may use many different network congestion control schemes. Data Center TCP (DCTCP) is a TCP congestion control scheme for data-center traffic, and is described in RFC 8257 published by the Internet Engineering Task Force (IETF). DCTCP scales the TCP congestion window based on an estimate of the number of transferred bytes that encounter congestion.

Remote direct memory access (RDMA) network protocols allow direct access to the memory of a remote computing device without involving the remote operating system. RDMA over converged Ethernet (RoCE) is a network protocol published by the InfiniBand$^{SM}$ Trade Association that allows RDMA over an Ethernet network. RoCE version one (RoCEv1) is an Ethernet link layer protocol. RoCE version two (RoCEv2) is an Internet layer protocol that is routable between networks. The RoCEv2 specification defines a congestion control protocol based on RFC 3168 published by the IETF. As part of the RoCEv2 congestion control protocol, a receiver sends one or more congestion notification packets (CNPs) to the transmitter device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
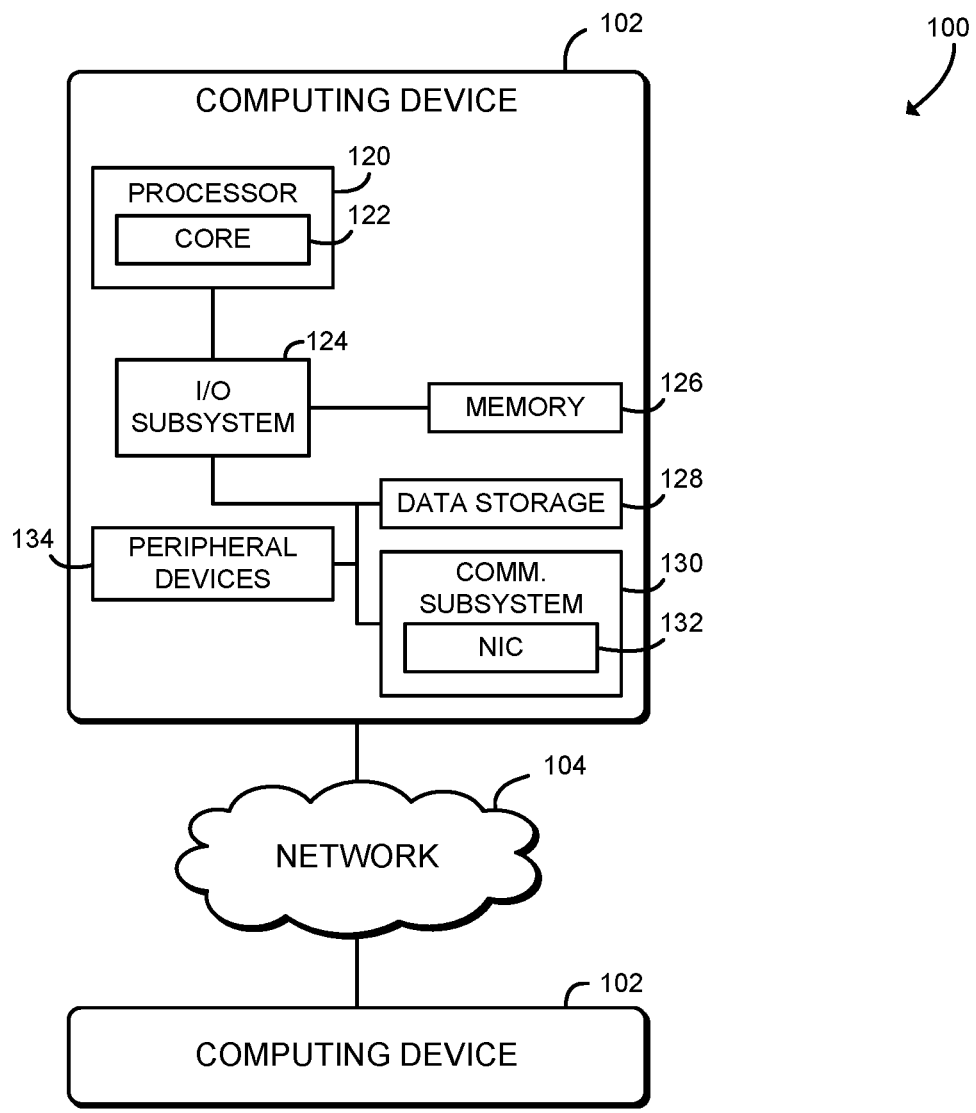
FIG. 1 is a simplified block diagram of at least one embodiment of a system for RoCEv2 congestion control.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for RoCEv2 congestion control includes multiple computing devices 102 in communication over a network 104. In use, as described further below, a requester device 102 sends RoCEv2 RDMA request packets to a responder device 102. If the network 104 is congested, switches or other network devices in the network 104 mark the request packets with a congestion encountered (CE) codepoint. The responder device 102 determines whether the request packets include the CE codepoint and echoes congestion information to the receiver by setting a bit in a base transport header (BTH) of one or more RDMA acknowledgment (ACK) packets. The requester device 102 updates its congestion window based on the ratio of acknowledged packets for which the corresponding ACK packets indicate congestion to the total number of packets acknowledged. Additionally, for RDMA read requests, the responder device 102 may limit the rate of transmission of the RDMA read response packets based on the congestion window. Thus, the system 100 may provide RoCEv2 congestion control without using congestion notification packets (CNPs), which may save network bandwidth. Additionally, the system 100 allows the requester device 102 to reduce its transmit rate proportional to congestion in the network 104, which may improve overall network performance. Also, the system 100 may prevent network congestion from RDMA read response packets, which are typically not subject to window or flow control mechanisms.

Each computing device 102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 102 may be embodied as a one or more compute sleds, memory sleds, or other racks, sleds, computing chassis, or other components of a physically disaggregated computing device. As shown in FIG. 1, the computing device 102 illustratively include a processor 120, an input/output subsystem 124, a memory 126, a data storage device 128, a communication subsystem 130, and/or other components and devices commonly found in a server or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 is illustratively a multi-core processor, however, in other embodiments the processor 120 may be embodied as a single or multi-core processor(s), digital signal processor, microcontroller, or other processor or processing/controlling circuit. The illustrative processor 120 includes multiple processor cores 122, each of which is an independent, general-purpose processing unit capable of executing programmed instructions. For example, each processor core 122 may execute instructions from a general-purpose instruction set architecture (ISA) such as IA-32 or Intel® 64. Although illustrated with one processor core 122, in some embodiments the processor 120 may include a larger number of processor cores 122, for example four processor cores 122, fourteen processor cores 122, twenty-eight processor cores 122, or a different number. Additionally, although illustrated as including a single processor 120, in some embodiments the computing device 102 may be embodied as a multi-socket server with multiple processors 120.

The memory 126 may be embodied as any type of volatile or non-volatile memory or data storage capable of performing the functions described herein. In operation, the memory 126 may store various data and software used during operation of the computing device 102 such operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 102, on a single integrated circuit chip. Similarly, the data storage device 128 may be embodied as any type of device or devices configured for short-term or long-term storage of data such as, for example, memory devices and circuits, memory cards, hard disk drives, solid-state drives, non-volatile flash memory, or other data storage devices.

The computing device 102 also includes the communication subsystem 130, which may be embodied as any communication circuit, device, or collection thereof, capable of enabling communications between the computing device 102 and other remote devices over the computer network 104. For example, the communication subsystem 130 may be embodied as or otherwise include a network interface controller (NIC) 132 or other network controller for sending and/or receiving network data with remote devices. The NIC 132 may be embodied as any network interface card, network adapter, host fabric interface, network coprocessor, or other component that connects the computing device 102 to the network 104. The communication subsystem 130 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication. In some embodiments, the communication subsystem 130 and/or the NIC 132 may form a portion of an SoC and be incorporated along with the processor 120 and other components of the computing device 102 on a single integrated circuit chip.

The computing device 102 may further include one or more peripheral devices 134. The peripheral devices 134 may include any number of additional input/output devices, interface devices, and/or other peripheral devices. For example, in some embodiments, the peripheral devices 134 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

The computing devices 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), and/or a wired or wireless wide area network (WAN). As such, the network 104 may include any number of additional devices, such as additional computers, routers, and switches, to facilitate communications among the devices of the system 100. In the illustrative embodiment, the network 104 is embodied as a local Ethernet network.

Figure 2:
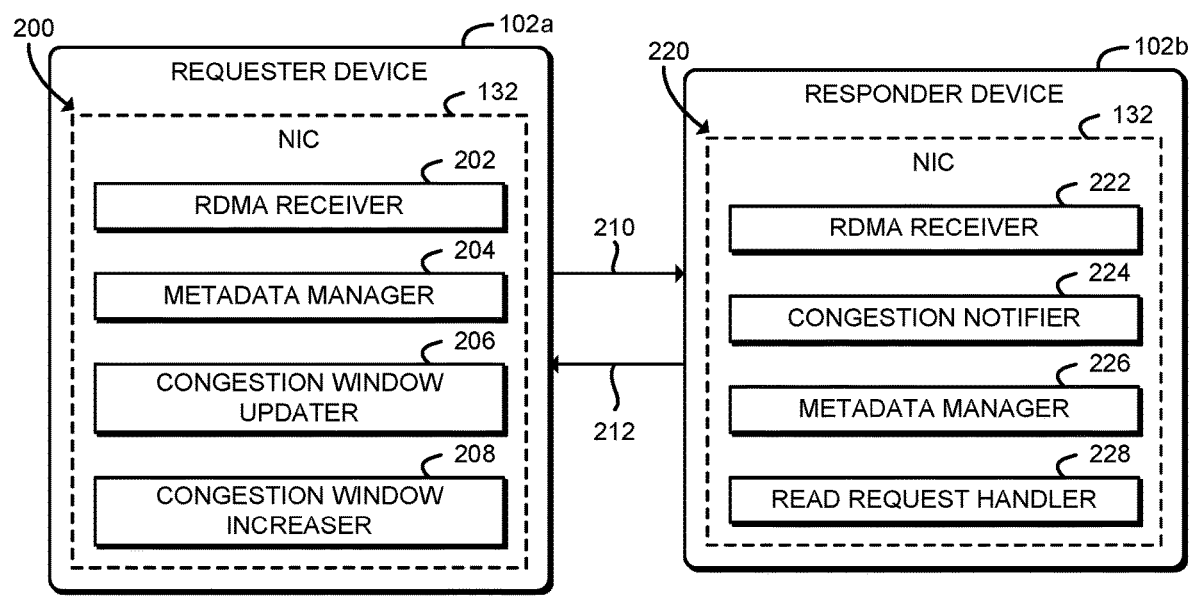
FIG. 2 is a simplified block diagram of at least one embodiment of various environments of the system of FIG. 1.

Referring now to FIG. 2, in an illustrative embodiment, a requester device 102*a* establishes an environment 200 during operation. The illustrative environment 200 includes an RDMA receiver 202, a metadata manager 204, a congestion window updater 206, and a congestion window increaser 208. As shown, the various components of the environment 200 may be embodied as hardware, firmware, software, or a combination thereof. As such, in some embodiments, one or more of the components of the environment 200 may be embodied as circuitry or collection of electrical devices (e.g., RDMA receiver circuitry 202, metadata manager circuitry 204, congestion window updater circuitry 206, and/or congestion window increaser circuitry 208). It should be appreciated that, in such embodiments, one or more of the RDMA receiver circuitry 202, the metadata manager circuitry 204, the congestion window updater circuitry 206, and/or the congestion window increaser circuitry 208 may form a portion of the processor 120, the NIC 132, the I/O subsystem 124, and/or other components of the requester device 102a. In the illustrative embodiment, the RDMA receiver 202, the metadata manager 204, the congestion window updater 206, and the congestion window increaser 208 are embodied as hardware, firmware, or other resources of the NIC 132. Additionally or alternatively, in some embodiments, those components may be embodied as hardware, firmware, or other resources of the processor 120 or other components of the requester device 102a. Additionally, in some embodiments, one or more of the illustrative components may form a portion of another component and/or one or more of the illustrative components may be independent of one another.

The RDMA receiver 202 is configured to receive routable RDMA acknowledgment (ACK) packets 212 from a responder device 102b. As described further below, the responder device 102b may generate the ACK packets 212 in response to one or more RDMA request packets 210 sent by the requester device 102a. Each of the ACK packets 212 includes an Internet protocol (IP) header, a stateless transport protocol header (e.g., a user datagram protocol (UDP) header), and an RDMA base transport header (BTH). Illustratively, each of the ACK packets 212 is an RDMA over converged Ethernet version 2 (RoCEv2) packet.

The metadata manager 204 is configured to determine a total number of packets 210 acknowledged in response to receiving the ACK packets 212. The metadata manager 204 is further configured to determine a number of congested packets 210 acknowledged in response to receiving the ACK packets 212. As described further below, each of the packets 212 indicating congestion has an express congestion notification bit of the RDMA BTH that is set. The express congestion notification bit may be embodied as, for example, a BECN bit of the BTH. The metadata manager 204 may be further configured to determine the total number of packets 210 and the number of congested packets 210 acknowledged during a round-trip time (RTT) window, and reset the total number of packets 210 and the number of congested packets 210 after expiration of the RTT window. The RTT window may be measured using the sequence number of the ACK packets 212.

The congestion window updater 206 is configured to update a congestion window as a function of the number of congested packets 210 and the total number of packets 210. The congestion window is an allowed number of outstanding, unacknowledged request packets 210 associated with the responder device 102b. Updating the congestion window may include determining a ratio of the number of congested packets 210 to the total number of packets 210, determining a congestion estimate as a function of the ratio, and updating the congestion window as a function of the congestion estimate.

The congestion window increaser 208 is configured to increase the congestion window in response to receiving an ACK packet 212 that acknowledges an outstanding request packet 210 when there is no congestion detected. For example, the congestion window increaser 208 may be configured to determine whether the number of congested packets 210 acknowledged is zero in response to receiving the ACK packets 212. The congestion window increaser 208 may be configured to determine whether the congestion window has a predetermined relationship (e.g., less than, less than or equal to, or other relationship) with a slow start threshold and to increment the congestion window in a slow start mode if the congestion window has the predetermined relationship with the slow start threshold. The congestion window increaser 208 may be configured to increment the congestion window in a congestion avoidance mode if congestion window does not have the predetermined relationship with the slow start threshold (e.g., if the congestion window is greater than or equal to, greater than, or otherwise doesn't have the predetermined relationship with the slow start threshold). The slow start mode may include incrementing the congestion window by a number of packets specified by a limit variable or by the number of request packets 210 that are acknowledged. The congestion avoidance mode may include accumulating a number of request packets 210 acknowledged, determining whether the number of request packets 210 acknowledged has a predetermined relationship (e.g., greater than, greater than or equal to, or other relationship) with the congestion window, and, if so, incrementing the congestion window by one packet.

Still referring to FIG. 2, in an illustrative embodiment, a responder device 102b establishes an environment 220 during operation. The illustrative environment 220 includes an RDMA receiver 222, a congestion notifier 224, a metadata manager 226, and a read request handler 228. As shown, the various components of the environment 220 may be embodied as hardware, firmware, software, or a combination thereof. As such, in some embodiments, one or more of the components of the environment 220 may be embodied as circuitry or collection of electrical devices (e.g., RDMA receiver circuitry 222, congestion notifier circuitry 224, metadata manager circuitry 226, and/or read request handler circuitry 228). It should be appreciated that, in such embodiments, one or more of the RDMA receiver circuitry 222, the congestion notifier circuitry 224, the metadata manager circuitry 226, and/or the read request handler circuitry 228 may form a portion of the processor 120, the NIC 132, the I/O subsystem 124, and/or other components of the responder device 102b. In the illustrative embodiment, the RDMA receiver 222, the congestion notifier 224, the metadata manager 226, and the read request handler 228 are embodied as hardware, firmware, or other resources of the NIC 132. Additionally or alternatively, in some embodiments, those components may be embodied as hardware, firmware, or other resources of the processor 120 or other components of the responder device 102b. Additionally, in some embodiments, one or more of the illustrative components may form a portion of another component and/or one or more of the illustrative components may be independent of one another.

The RDMA receiver 222 is configured to receive a routable RDMA packet 210 from the requester device 102a over an Ethernet network. The routable RDMA packet 210 includes an Internet protocol (IP) header, a stateless transport protocol header (e.g., user datagram protocol (UDP) header), an RDMA base transport header (BTH), and an RDMA payload. Illustratively, the routable RDMA packet 210 is embodied as an RDMA over converged Ethernet version 2 (RoCEv2) packet 210.

The congestion notifier 224 is configured to determine whether the IP header of the routable RDMA packet 210 includes a congestion encountered (CE) code point. The congestion notifier 224 is further configured to send an acknowledgment (ACK) packet 212 to the requester device 102a in response to determining that the IP header includes the CE code point. Similar to the routable RDMA packet 210, the ACK packet 212 is a routable RDMA packet that includes an IP header, a stateless transport protocol header (e.g., UDP header), and an RDMA BTH. An express congestion notification bit of the RDMA BTH of the ACK packet 212 is set. For example, the express congestion notification bit may be the BECN bit of the BTH. The congestion notifier 224 may be further configured to send an ACK packet 212 to the requester device 102a in response to determining that the IP header does not include the CE code point. If the IP header does not include the CE code point, the express congestion notification bit of the RDMA BTH is not set. In some embodiments, the congestion notifier 224 may be further configured to immediately send a one or more additional ACK packets 212 to the requester device 102a in response to determining that the IP header includes the CE code point. In those embodiments, the additional ACK packets 212 are associated with unacknowledged request packets 210, and the express congestion notification bit of the RDMA BTH those ACK packets 212 is not set.

The metadata manager 226 manages one or more variables or other metadata associated with each RDMA connection. The metadata manager 226 is configured to determine whether a congestion state associated with the requester device 102a has changed in response to determining whether the IP header includes the CE code point. The metadata manager 226 is configured to store an expected packet sequence number as a previous expected packet sequence number in response to determining that the congestion state has changed, and to set a flag to request immediate acknowledgment of the routable RDMA packet 210.

In some embodiments, the routable RDMA packet 210 may be an RDMA read request, including an RDMA read request payload. In those embodiments, the read request handler 228 is configured to determine a transmit rate as a function of a congestion window and a round-trip time (RTT). As described above, the congestion window includes an allowed number of outstanding packets associated with the requester device 102a. The read request handler 228 is further configured to send multiple routable RDMA read response packets 212 to the requester device 102a at the transmit rate. In some embodiments, sending the read response packets 212 may include determining a next transmit time as a function of the transmit rate, waiting for the next transmit time, and, after waiting, sending one of the read response packets 212. The next transmit time may be determined based on a current timestamp and a clock period of the responder device 102b (e.g., a clock period of the NIC 132) and the transmit rate. The current timestamp may be a counter variable that is incremented once per clock period. Waiting for the next transmit time may include dropping a transmit transaction if the current timestamp is less than the next transmit time.

Additionally, although illustrated for clarity in FIG. 2 as being established by a separate requester device 102a and responder device 102b, it should be understood that the same computing device 102 may perform the operations of both the requester device 102a and the responder device 102b. Thus a computing device 102 may establish both of the environments 200, 220.

Figure 3:
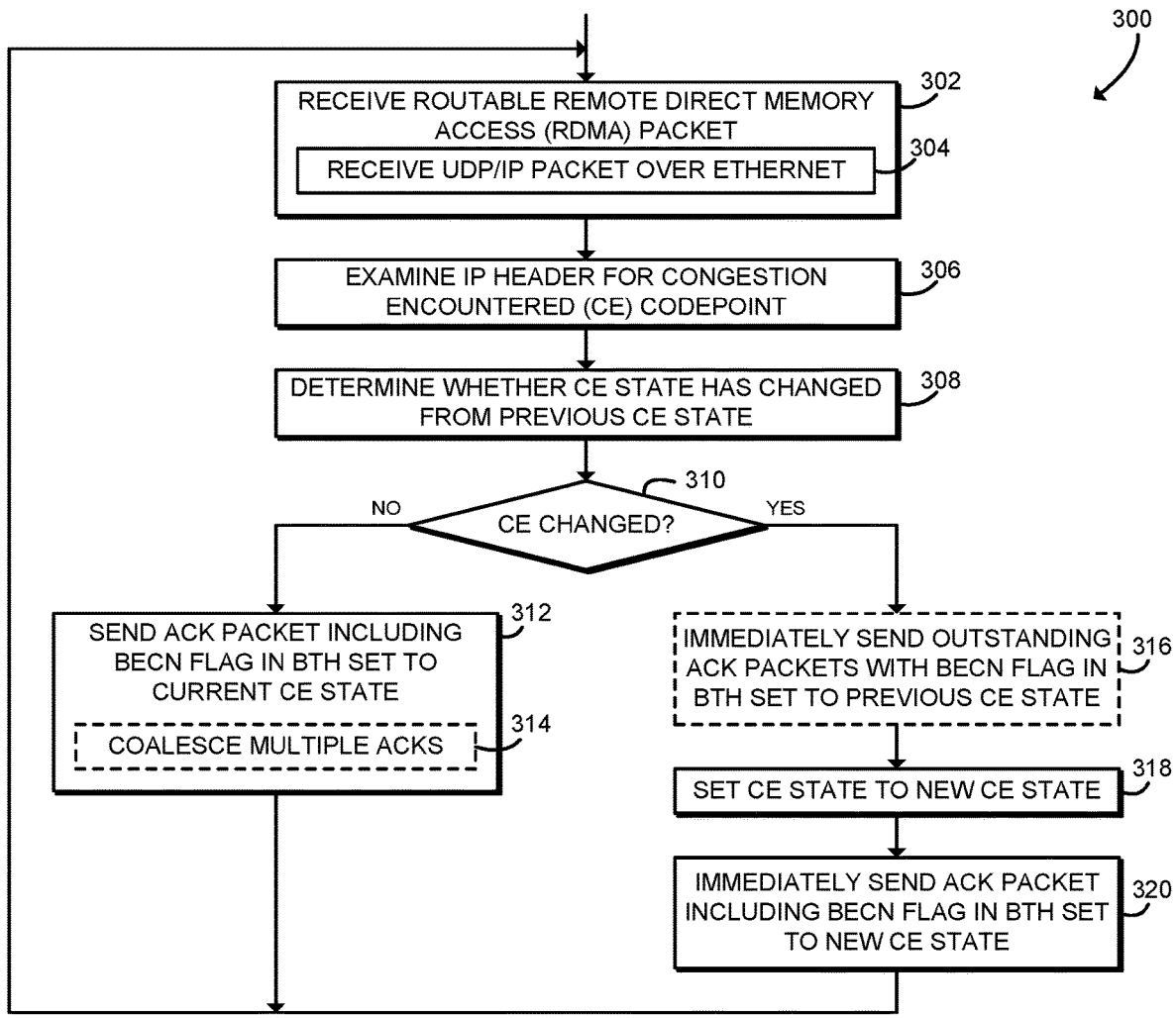
FIG. 3 is a simplified flow diagram of at least one embodiment of a method for congestion notification that may be executed by a responder device of FIGS. 1-2.

Referring now to FIG. 3, in use, a computing device 102 may execute a method 300 for congestion notification. It should be appreciated that, in some embodiments, the operations of the method 300 may be performed by one or more components of the environment 220 of the responder device 102b as shown in FIG. 2. The method 300 begins in block 302, in which the responder device 102b receives a routable RDMA packet 210 from a requester device 102a. The RDMA packet 210 may be embodied as a RoCEv2 request packet, and may include an RDMA write request or other RDMA request that may be responded to by the responder device 102b with an RDMA acknowledgment (ACK) packet 212. Processing of RDMA read request packets 210 is described further below in connection with the method of FIG. 7. In block 304, the responder device 102b receives a UDP/IP packet 210 over an Ethernet network 104. The packet 210 thus includes an IP header, a UDP header, and an encapsulated RDMA packet. The RDMA packet further includes an RDMA base transport header (BTH), an RDMA payload, and may include other data such as an end-to-end CRC (ICRC) or an Ethernet frame checksum (FCS).

In block 306, the responder device 102b examines the IP header of the request packet 210 for a congestion encountered (CE) codepoint. Switches and/or other network devices of the network 104 may mark packets that encounter congestion by setting the CE codepiont in the IP header. The network devices may use any appropriate criteria to detect congestion. For example, a switch may mark packets with the CE codepoint when its queue depth exceeds a predetermined threshold. The IP header may be embodied as an IP version 4 header, an IP version 6 header, or any other appropriate IP header.

In block 308, the responder device 102b determines whether the CE state of the connection with the requester device 102a has changed from a previous CE state. For example, the responder device 102b may determine whether the current request packet 210 indicates congestion exists when previous requests indicated congestion did not exist, or vice versa. To identify whether the CE state has changed, the responder device 102b (e.g., the NIC 132 of the responder device 102b) may implement a state machine, such as the state machine illustrated in FIG. 4 and described further below. In block 310, the responder device 102b determines whether the CE state has changed. If so, the method 300 branches to block 316, described below. If the CE state has not changed, the method 300 branches to block 312.

In block 312, the responder device 102b sends an ACK packet 212 that includes the BECN bit of the BTH set to the current CE state. For example, if there is no congestion (e.g., the CE codepoint of the request packet 210 is not set), the BECN bit is not set. If there is congestion (e.g., if the CE codepoint of the request packet 210 is set), the BECN bit is set. In some embodiments, in block 314 the responder device 102b may coalesce several ACK packets 212. For example, the responder device 102b may send an ACK packet 212 for every two request packets 210 received, or otherwise send an ACK packet 212 for every n request packets 210. The ACK packet 212 that is sent may include a sequence number of the most recently received request packet 210, and the requester device 102a may interpret that ACK packet 212 as also acknowledging unacknowledged request packets 210 having a lower sequence number. After sending the ACK packet 212 (or determining that the acknowledgment will be coalesced into a later ACK packet 212), the method 300 loops back to block 302 to continue receiving RDMA request packets 210.

Referring back to block 310, if the CE state changes, the method 300 branches to block 316. In some embodiments, in block 316 the responder device 102b may immediately send outstanding ACK packets 212 with the BECN bit of the BTH set to the previous CE state. For example, if the currently received request packet 210 includes the CE codepoint, the responder device 102b may send ACK packets 212 that do not have the BECN bit set. As another example, if the currently received request packet 210 does not include the CE codepoint, the responder device 102b may send ACK packets 212 that do have the BECN bit set. The responder device 102b may immediately send one or more ACK packets 212 for any request packets 210 that have been received and not yet acknowledged (e.g., due to coalescing ACKs).

In block 318, the responder device 102b sets the CE state to the new CE state of the currently received request packet 210. For example, if the currently received request packet 210 includes the CE codepoint, the CE state is set to indicate congestion. As another example, if the currently received request packet 210 does not include the CE codepoint, the CE state is set to indicate no congestion. The CE state may be recorded in one or more variables, state machines, or other metadata associated with the requester device 102a.

In block 320, the responder device 102b immediately sends an ACK packet 212 for the current request packet 210. The responder device 102b sets the BECN bit in the BTH of the ACK packet 212 according to the current CE state. For example, if the CE state indicates congestion is detected, the BECN bit is set, and if the CE state indicates congestion is not detected, the BECN bit is not set. After sending the ACK packet 212, the method 300 loops back to block 302 to continue receiving RDMA request packets 210.

Figure 4:
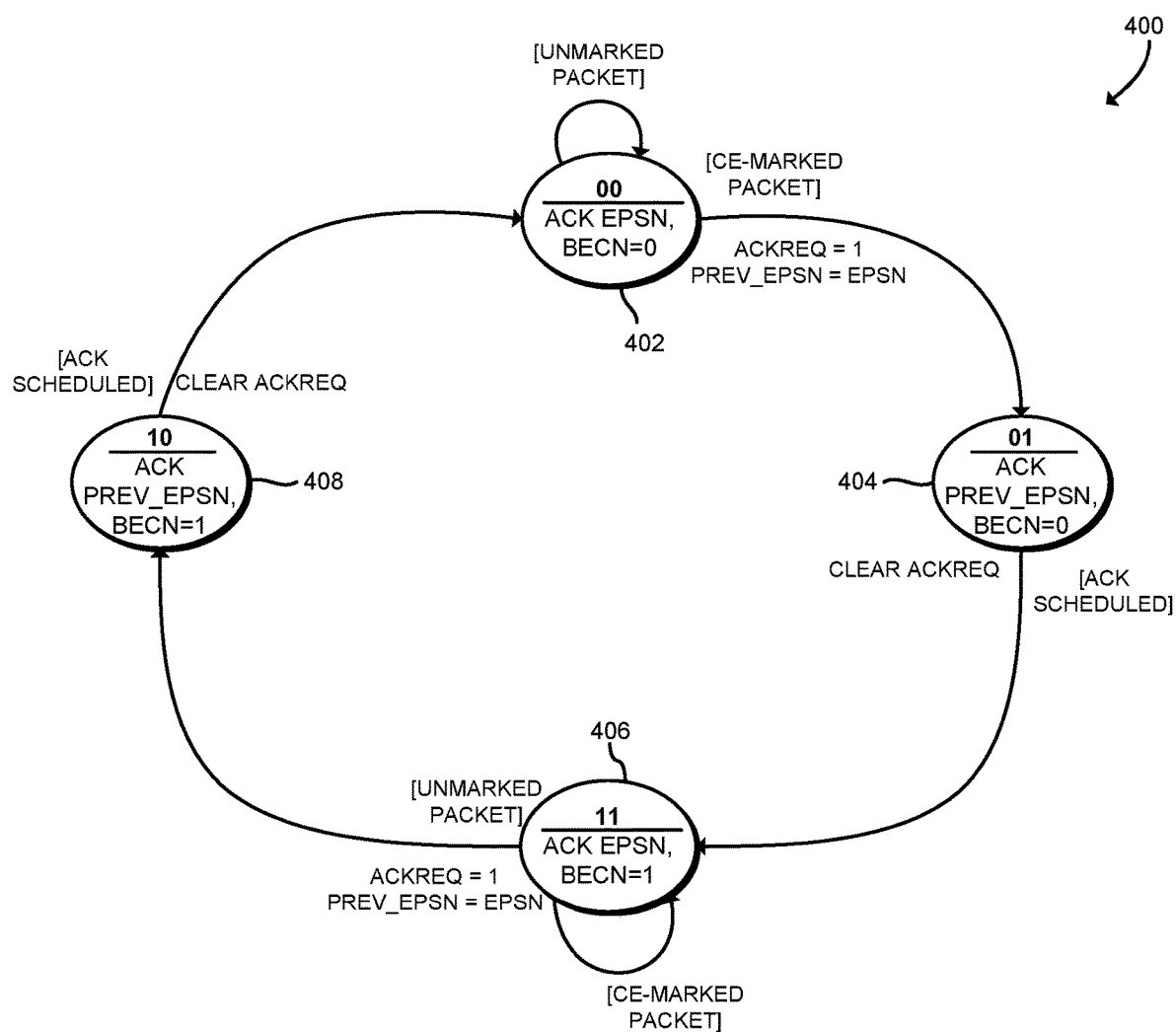
FIG. 4 is a simplified state transition diagram of a state machine that may perform the method of FIG. 3.

Referring now to FIG. 4, state transition diagram 400 illustrates a state machine that may be implemented by the responder device 102b to perform the operations of the method 300. State data and other variables of the state machine may be stored in metadata such as a connection context associated with a requester device 102a. The metadata may include a variable epsn, which is a 24-bit variable that stores the expected packet sequence number for the next received request packet 210. This sequence number contains all CE-marked and CE-unmarked packets 210. The metadata may include a variable previous_epsn, which is a 24-bit variable that stores the packet sequence number recorded when the congestion control state machine toggles to the next state. The metadata may include a variable dctcp_ackreq, which is a 1-bit field that indicates that ACKs need to be generated for this connection at the previous_epsn. The dctcp_ackreq variable may be set after the congestion control state machine transitions states.

As shown, the state machine includes four states 402, 404, 406, 408, which may be represented by a two-bit state variable dctcp_state in the metadata. The state machine starts in state 402, with dctcp_state equal to 00. In the state 402, the responder device 102b generates ACKs normally with the BECN bit set to zero, using the epsn variable. The state machine remains in state 402 until a CE-marked packet 210 is received. When a marked packet 210 arrives, variable dctcp_ackreq is set to equal 1, variable previous_epsn is set to the current value of the variable epsn, and the state machine transitions to the state 404, with dctcp_state equal to 10.

In state 404, the responder device 102b sends ACKs with the BECN bit set to zero using the previous_epsn variable. The state machine remains in state 404 until an ACK has been scheduled. While in the state 404, the variable previous_epsn is updated by one for each successfully received unmarked packet 210. Once an ACK has been scheduled, the state machine transitions to the state 406, with dctcp_state equal to 11, and the dctcp_ackreq flag is cleared.

In the state 406, the responder device 102b generates ACKs normally with the BECN bit set to one, using the epsn variable. The state machine remains in state 406 until an unmarked packet 210 is received. When an unmarked packet 210 arrives, variable dctcp_ackreq is set to equal 1, variable previous_epsn is set to the current value of the variable epsn, and the state machine transitions to state 408, with dctcp_state equal to 10.

In state 408, the responder device 102b sends ACKs with the BECN bit set to one using the previous_epsn variable. The state machine remains in state 408 until an ACK has been scheduled. While in the state 408, the variable previous_epsn is updated by one for each successfully received marked packet 210. Once an ACK has been scheduled, the state machine transitions to the state 402, with dctcp_state equal to 00, and the dctcp_ackreq flag is cleared.

Figure 5:
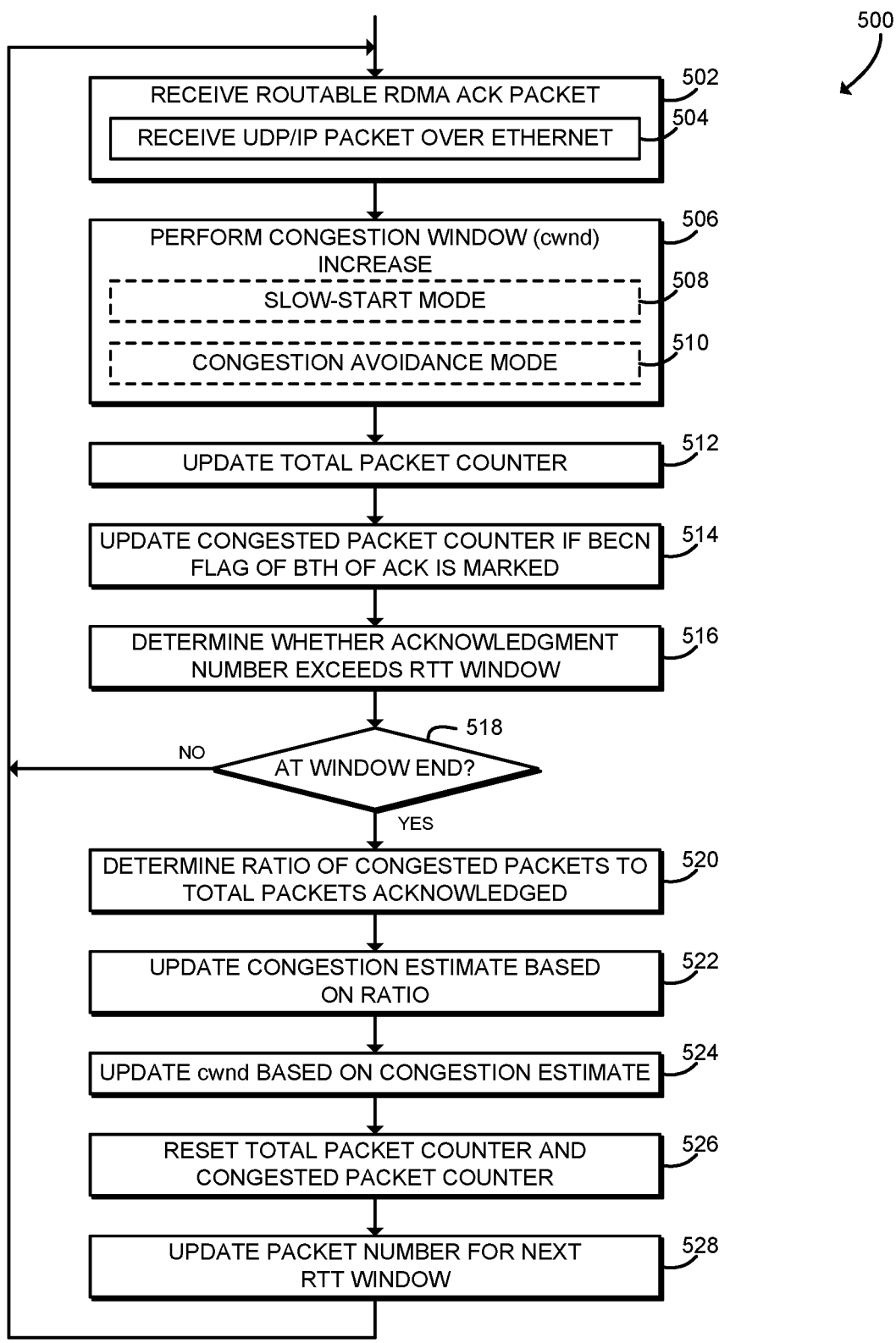
FIG. 5 is a simplified flow diagram of at least one embodiment of a method for congestion window management that may be executed by a requester device of FIGS. 1-2.

Referring now to FIG. 5, in use, a computing device 102 may execute a method 500 for congestion window management. It should be appreciated that, in some embodiments, the operations of the method 500 may be performed by one or more components of the environment 200 of the requester device 102a as shown in FIG. 2. The method 500 begins in block 502, in which the requester device 102a receives a routable RDMA acknowledgment (ACK) packet 212 from the responder device 102b. As described above, the ACK packet 212 may be sent by the responder device 102b in response to one or more RDMA request packets 210 sent by the requester device 102a. In block 504, the requester device 102a receives a UDP/IP packet 212 over an Ethernet network 104. The packet 212 thus includes an IP header, a UDP header, and an encapsulated RDMA ACK packet, including an RDMA base transport header (BTH).

In block 506, the requester device 102a may perform a congestion window (cwnd) increase. The congestion window indicates the number of request packets 210 that are allowed to be sent without waiting for a corresponding ACK packet 212. The requester device 102a may increase the congestion window if an ACK packet 212 is received that acknowledges a previously unacknowledged request packet 210 and if congestion is not detected on the network 104. The requester device 102a may increase the congestion window using any congestion control scheme. In some embodiments, in block 508 the requester device 102a may increase the congestion window in a slow-start mode. In some embodiments, in block 510, the requester device 102a may increase the congestion window in a congestion avoidance mode. One potential embodiment of a method for increasing the congestion window is described below in connection with FIG. 6.

In block 512, the requester device 102a updates a total packet counter based on the number of packets acknowledged by the received ACK packets 212. The total packet counter records the number of packets acknowledged during the current round-trip time (RTT) window. In some embodiments, the total packet counter may be embodied as a 32-bit variable acked_packets_total. In block 514, the requester device 102a updates a congested packet counter if the BECN bit of the BTH of the current ACK packet 212 is set. As described above, the responder device 102b sets the BECN bit if the network 104 marks request packets 210 as experiencing congestion. The congested packet counter records the number of acknowledged packets that experienced congestion during the current RTT window. In some embodiments, the total packet counter may be embodied as a 32-bit variable acked_packets_ecn.

In block 516, the requester device 102a determines whether the packet sequence number of the current ACK packet 212 exceeds the current RTT window. As described further below, the current RTT window may be stored in a 32-bit variable rt_seq_num that is set at as the next packet sequence number at the end of the previous RTT window. In block 518, the requester device 102a checks whether the end of the RTT window has been reached. To do so, the requester device 102a may determine whether the packet sequence number of the BTH of the current ACK packet 212 is greater than or equal to rt_seq_num. If not, the method 500 loops back to block 502 to continue receiving ACK packets 212. If the end of the RTT window has been reached, the method 500 advances to block 520.

In block 520, the requester device 102a determines the ratio of congested packets to the total packets acknowledged. To determine the ratio, the requester device 102a may calculate the value M as shown in Equation 1, below. In block 522, the requester device 102a updates a congestion estimate α based on the ratio M. To determine the congestion estimate α, the requester device 102a may evaluate Equation 2, as shown below. In some embodiments, if acked_packets_ecn equals zero, then acked_packets_ecn may be incremented to one to avoid divide-by-zero issues. As shown in Equation 2, g is a constant number. The default value of g is 1/16. The value of g may be determined based on hardware attributes of the system 100 (e.g., particular implementation of the NIC 132 or other hardware) and may not be modified at runtime or otherwise modified by software.

$$M = acked\_packets\_ecn/acked\_packets\_total \quad (1)$$

$$\alpha = (1-g)*\alpha + g*M \quad (2)$$

In some embodiments, the congestion estimate α may be stored in an 11-bit variable dctcp_alpha. In those embodiments, to avoid floating-point math, dctcp_alpha may be calculated using Equation 3, below. In Equation 3, dctcp_shift_g may be determined as the negative log base 2 of g. For example, if g is 1/8, dctcp_shift_g is 3; if g is 1/16, dctcp_shift_g is 4; g is 1/32, dctcp_shift_g is 5; and so on. If the result of Equation 3 is greater than 1024, then dctcp_alpha may be saturated at 1024 and stored. This operation may be performed using Equation 4, below.

$$dctcp\_alpha = dctcp\_alpha - (dctcp\_alpha >> dctcp\_shift\_g) + (acked\_packets\_ecn << (10 - dctcp\_shift\_g))/acked\_packets\_total \quad (3)$$

$$if(dctcp\_alpha > 1024) dctcp\_alpha = 1024 \quad (4)$$

In block 524, the requester device 102a updates the congestion window cwnd based on the congestion estimate α. The congestion window cwnd may be reduced based on the ratio of packets that experienced congestion during the RTT window, down to a minimum of two packets. The requester device 102a may update the congestion window cwnd using Equation 5, below. The updated congestion window cwnd is used by the requester device 102a to determine how many request packets 210 may be outstanding before waiting to receive ACK packets 212.

$$cwnd = \max(cwnd - ((cwnd*dctcp\_alpha) >> 11), 2) \quad (5)$$

After updating the congestion window cwnd, in block 526 the requester device 102a resets the total packet counter and the congested packet counter to zero. In block 528, the requester device 102a updates the packet sequence number for the next RTT window. As described above, the requester device 102a may store the current next packet sequence number for a request packet 210 into the variable rt_seq_num. This number marks the beginning of a RTT window used for counting or timing operations. After updating the next RTT window sequence number, the method 500 loops back to block 502 to continue receiving ACK packets 212.

Figure 6:
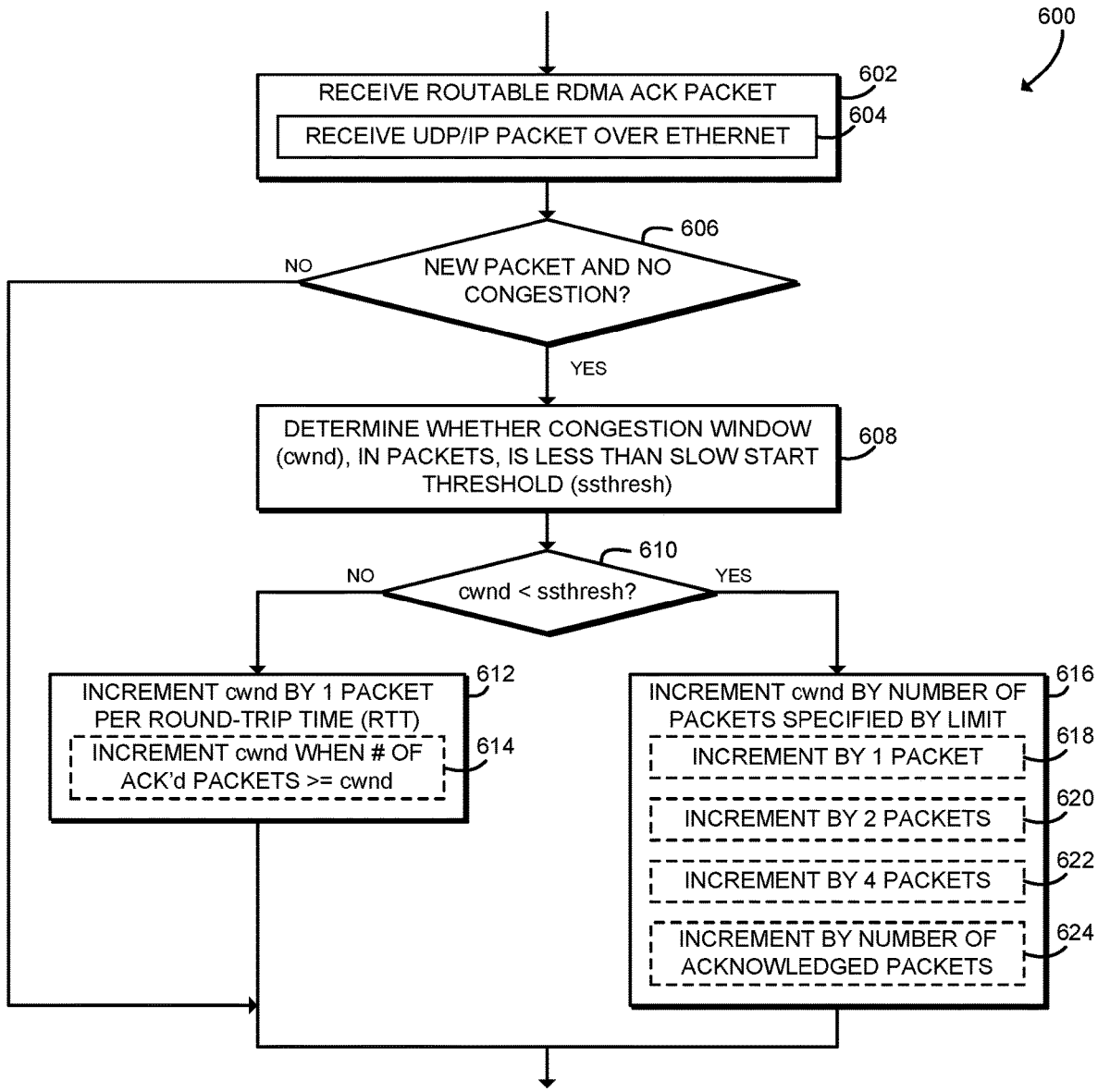
FIG. 6 is a simplified flow diagram of at least one embodiment of a method for congestion window growth that may be executed by a requester device of FIGS. 1-2.

Referring now to FIG. 6, in use, a computing device 102 may execute a method 600 for congestion window growth. It should be appreciated that, in some embodiments, the operations of the method 600 may be performed by one or more components of the environment 200 of the requester device 102a as shown in FIG. 2. The method 600 begins in block 602, in which the requester device 102a receives a routable RDMA acknowledgment (ACK) packet 212 from the responder device 102b. As described above, the ACK packet 212 may be sent by the responder device 102b in response to one or more RDMA request packets 210 sent by the requester device 102a. In block 604, the requester device 102a receives a UDP/IP packet 212 over an Ethernet network 104. The packet 212 thus includes an IP header, a UDP header, and an encapsulated RDMA ACK packet, including an RDMA base transport header (BTH).

In block 606, the requester device 102a determines whether the ACK packet 212 acknowledges one or more previously unacknowledged request packets 210, and whether no congestion has been encountered on the network 104. For example, the requester device 102a may determine whether the counter acked_packets_ecn equals zero. If not (e.g., if the ACK packet 212 is a duplicate or otherwise does not acknowledge an outstanding request packet 210, or if congestion was encountered), the method 600 is complete. In that circumstance, the requester device 102a may reduce the congestion window as described above in connection with FIG. 5.

Referring back to block 606, if the ACK packet 212 acknowledges one or more outstanding request packets 210 and no congestion was encountered, the method 600 advances to block 608. In block 608, the requester device 102a determines whether the congestion window cwnd is less than a slow start threshold ssthresh. As described above, the congestion window cwnd is the number of request packets 210 that are allowed to be outstanding and unacknowledged before the requester device 102a waits to receive an ACK packet 212. The variable ssthresh may be embodied as 32-bit variable. The value of ssthresh may be set according to attributes of the system 100 or otherwise set using any appropriate algorithm or other criteria. In block 610, the requester device 102a checks whether cwnd is less than ssthresh. If so, the method 600 branches to block 616 to operate in a slow-start mode, as described below. If cwnd is not less than ssthresh, the method 600 branches to block 612 to operate in a congestion avoidance mode.

In block 612, the requester device 102a increments the command window cwnd by one packet per round-trip time (RTT). To increment cwnd, in some embodiments in block 614 the requester device 102a may accumulate the number of acknowledged request packets 210, and once the accumulated number is greater than or equal to cwnd, the requester device 102a increments cwnd by one. After incrementing cwnd, the method 600 is completed. The requester device 102a may continue to process ACK packets 212 as described above in connection with FIG. 5.

Referring back to block 610, if cwnd is less than ssthresh, the method 600 branches to block 616, in which the requester device 102a increments cwnd by a number of packets specified by a user-defined variable limit. The variable limit may be embodied as a 2-bit field that indicates by which number of packets to increment cwnd. In some embodiments, in block 618 the requester device 102a may increment cwnd by 1, for example if limit equals 00. In some embodiments, in block 620 the requester device 102a may increment cwnd by 2, for example if limit equals 01. In some embodiments, in block 622 the requester device 102a may increment cwnd by 4, for example if limit equals 10. Incrementing cwnd by 4 packets may be suitable for experimental networks. In some embodiments, in block 624 the requester device 102a may increment cwnd by the number of request packets 210 that were acknowledged, for example if limit equals 11. Incrementing cwnd by the number of acknowledged packets may be suitable for experimental networks. After incrementing cwnd, the method 600 is completed. The requester device 102a may continue to process ACK packets 212 as described above in connection with FIG. 5.

Figure 7:
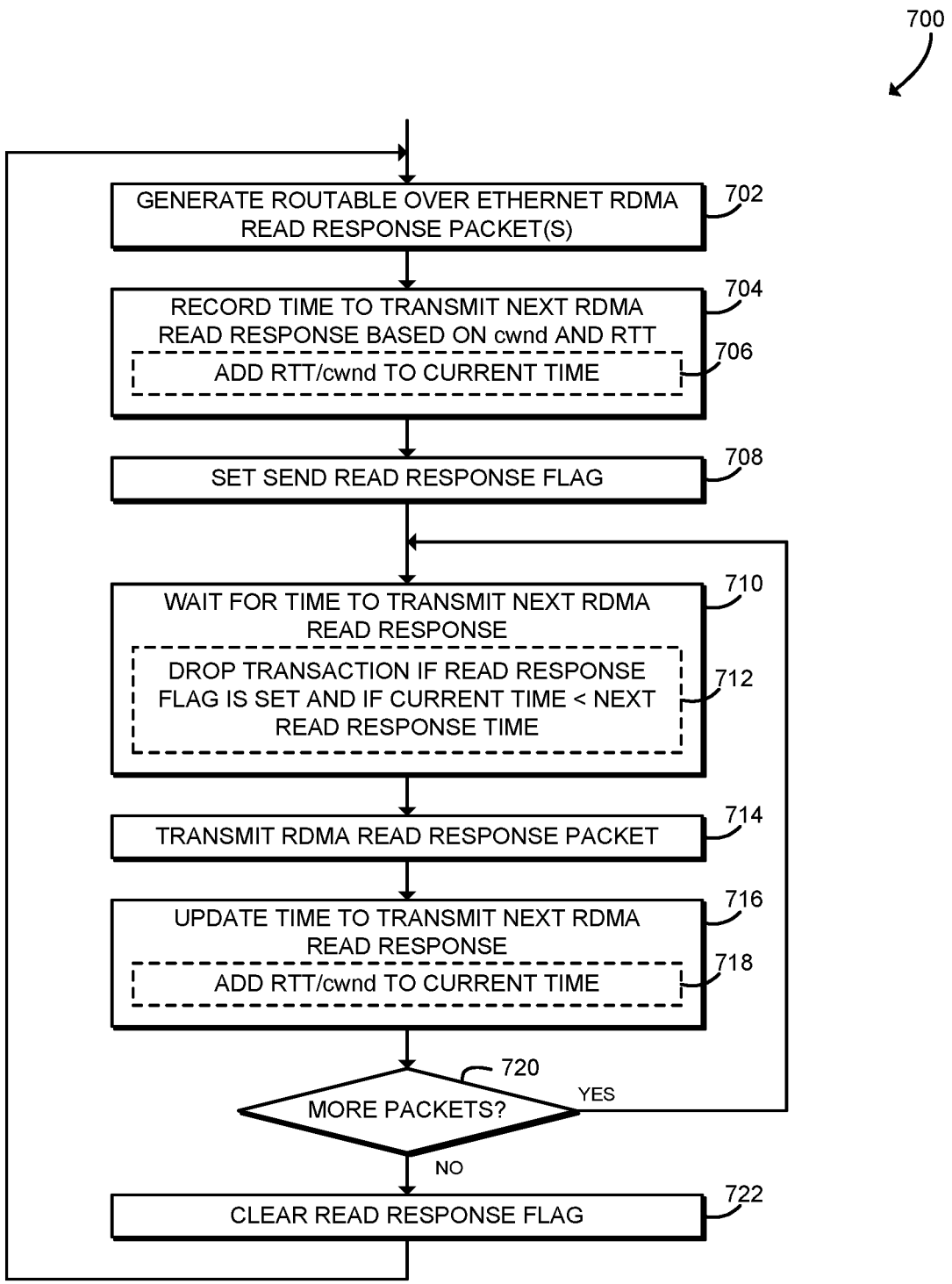
FIG. 7 is a simplified flow diagram of at least one embodiment of a method for sending RDMA read responses that may be executed by a responder device of FIGS. 1-2.

Referring now to FIG. 7, in use, a computing device 102 may execute a method 700 for sending RDMA read responses. It should be appreciated that, in some embodiments, the operations of the method 700 may be performed by one or more components of the environment 220 of the responder device 102b as shown in FIG. 2. The method 700 begins in block 702, in which the responder device 102b generates one or more routable RDMA read response packets 212. The read response packets 212 are generated in response to an RDMA read request packet 210 received from the requester device 102a, as described above. Each RDMA read response packet 212 may be embodied as a RoCEv2 response packet, including an IP header, a UDP header, and an encapsulated RDMA packet. The read response packets 212 return data at the sequence number of the RDMA read request packet 210. The first and last or only read response packet 212 also returns an express acknowledgment.

In block 704, the responder device 102b records a time to transmit the next RDMA read response based on the current congestion window cwnd and the round-trip time (RTT) to the requester device 102a. The time to transmit may be determined by converting the congestion window cwnd into a rate that packets may be sent per-RTT. In some embodiments, in block 706, the responder device 102b may determine the time to transmit by adding the RTT divided by the congestion window cwnd to the current time. Current time may be determined using a counter tstamp, which may be embodied as a 32-bit counter that runs at the clock rate of the responder device 102b (e.g., at the clock rate of the NIC 132). The time to transmit may be stored in a variable next_rdresp_stamp, which may be stored in connection metadata associated with the requester device 102a. The timestamp of the time to transmit the next read response may be determined using Equation 6, below. In block 708, the responder device 102b sets a variable indicating that read responses should be sent. The flag may be embodied as a 1-bit field next_rdresp_tstamp_vld.

$$\text{next\_rdresp\_stamp} = t\text{stamp} + RTT/cwnd/\text{clock\_period} \quad (6)$$

In block 710, the responder device 102b waits for the time to transmit the next RDMA read response. The responder device 102b may use any appropriate technique to wait the appropriate amount of time. In some embodiments, in block 712 the responder device 102b may drop a transaction to send the read response if the read response flag (e.g., next_rdresp_tstamp_vld) is set and if the current time is less than the next read response time (e.g., next_rdresp_stamp).

In block 714, after waiting until the transmit time, the responder device 102b transmits an RDMA read response packet 212 to the requester device 102a. In block 716, the responder device updates the time to transmit the next read response. As described above, in some embodiments in block 718 the responder device 102b may determine the time to transmit by adding the RTT divided by the congestion window cwnd to the current time, for example using Equation 6 above.

In block 720, the responder device 102b determines whether additional read response packets 212 remain to be sent to the requester device 102a. If so, the method 700 loops back to block 710 to wait for the next transmit time. If not, the method 700 advances to block 722, in which the responder device 102b clears the read response flag (e.g., clears the variable next_rdresp_tstamp_vld). After clearing the read response flag, the method 700 loops back to block 702, in which the responder device 102b may generate additional read response packets 212.

It should be appreciated that, in some embodiments, the methods 300, 500, 600, and/or 700 may be embodied as various instructions stored on a computer-readable media, which may be executed by the processor 120, the NIC 132, and/or other components of the computing device 102 to cause the computing device 102 to perform the respective method 300, 500, 600, and/or 700. The computer-readable media may be embodied as any type of media capable of being read by the computing device 102 including, but not limited to, the memory 126, the data storage device 128, firmware devices, microcode, other memory or data storage devices of the computing device 102, portable media readable by a peripheral device 134 of the computing device 102, and/or other media.

EXAMPLES

Illustrative examples of the technologies disclosed herein are provided below. An embodiment of the technologies may include any one or more, and any combination of, the examples described below.

Example 1 includes a computing device for remote direct memory access (RDMA) congestion control, the computing device comprising: an RDMA receiver to receive a routable RDMA packet from a requester device over an Ethernet network, wherein the routable RDMA packet comprises an Internet protocol (IP) header, a stateless transport protocol header, an RDMA base transport header (BTH), and an RDMA payload; and a congestion notifier to (i) determine whether the IP header of the routable RDMA packet includes a congestion encountered code point, and (ii) send an acknowledgment packet to the requester device in response to a determination that the IP header includes the congestion encountered code point, wherein the acknowledgment packet comprises a routable RDMA packet that includes an IP header, a stateless transport protocol header, and an RDMA BTH, and wherein an express congestion notification bit of the RDMA BTH is set.

Example 2 includes the subject matter of Example 1, and wherein: the stateless transport protocol header comprises a user datagram protocol (UDP) header; and the routable RDMA packet comprises an RDMA over converged Ethernet version 2 (RoCEv2) packet.

Example 3 includes the subject matter of any of Examples 1 and 2, and wherein the express congestion notification bit comprises a BECN bit.

Example 4 includes the subject matter of any of Examples 1-3, and wherein the congestion notifier is further to send an acknowledgment packet to the requester device in response to a determination that the IP header does not include the congestion encountered code point, wherein the acknowledgment packet comprises an RDMA BTH, and wherein an express congestion notification bit of the RDMA BTH is not set.

Example 5 includes the subject matter of any of Examples 1-4, and wherein: the congestion notifier is further to immediately send a second acknowledgement packet to the requester device in response to the determination that the IP header includes the congestion encountered code point, wherein the second acknowledgment packet is associated with one or more unacknowledged request packets, and wherein the second acknowledgment packet comprises an RDMA BTH, and wherein an express congestion notification bit of the RDMA BTH of the second acknowledgment packet is not set; wherein to send the acknowledgment packet comprises to send the acknowledgment packet in response to an immediate send of the second acknowledgment packet.

Example 6 includes the subject matter of any of Examples 1-5, and further comprising a metadata manager to: determine whether a congestion state associated with the requester device has changed in response to a determination whether the IP header includes the congestion encountered code point; store an expected packet sequence number as a previous expected packet sequence number in response to a determination that the congestion state has changed; and set a flag to request immediate acknowledgment of the routable RDMA packet.

Example 7 includes the subject matter of any of Examples 1-6, and wherein the computing device comprises a network controller, and wherein the network controller comprises the RDMA receiver and the congestion notifier.

Example 8 includes the subject matter of any of Examples 1-7, and further comprising an RDMA read request handler, wherein: the RDMA receiver is to receive a routable RDMA read request packet from the requester device over the Ethernet network, wherein the routable RDMA read request packet comprises an Internet protocol (IP) header, a stateless transport protocol header, an RDMA base transport header (BTH), and an RDMA read request payload; and the RDMA read request handler is to (i) determine a transmit rate as a function of a congestion window and a round-trip time, wherein the congestion window comprises an allowed number of outstanding packets associated with the requester device, and (ii) send a plurality of routable RDMA read response packets to the requester device at the transmit rate.

Example 9 includes the subject matter of any of Examples 1-8, and wherein to send the plurality of routable RDMA read response packets comprises to: determine a next transmit time as a function of the transmit rate; wait for the next transmit time; and send a first routable RDMA read response packets of the plurality of routable RDMA read response packets in response to a wait for the next transmit time.

Example 10 includes the subject matter of any of Examples 1-9, and wherein: to determine the next transmit time comprises to determine the next transmit time based on a current timestamp, a clock period of the computing device, and the transmit rate; and to wait for the next transmit time comprises to drop a transmit transaction if the current timestamp is less than the next transmit time, wherein the current timestamp comprises a counter variable that is incremented once per clock period.

Example 11 includes a computing device for remote direct memory access (RDMA) congestion control, the computing device comprising: an RDMA receiver to receive a plurality of routable RDMA acknowledgment packets from a responder device, wherein each of the routable RDMA acknowledgment packets comprises an Internet protocol (IP) header, a stateless transport protocol header, an RDMA base transport header (BTH); a metadata manager to (i) determine a total number of packets acknowledged in response to receipt of the plurality of routable RDMA acknowledgment packets, and (ii) determine a number of congested packets acknowledged in response to the receipt of the plurality of routable RDMA acknowledgment packets, wherein each of the congested packets has an express congestion notification bit of the RDMA BTH that is set; and a congestion window updater to update a congestion window as a function of the number of congested packets and the total number of packets, wherein the congestion window comprises an allowed number of outstanding request packets associated with the responder device.

Example 12 includes the subject matter of Example 11, and wherein: the stateless transport protocol header comprises a user datagram protocol (UDP) header; and each of the routable RDMA acknowledgment packets comprises an RDMA over converged Ethernet version 2 (RoCEv2) packet.

Example 13 includes the subject matter of any of Examples 11 and 12, and wherein the express congestion notification bit comprises a BECN bit.

Example 14 includes the subject matter of any of Examples 11-13, and wherein to update the congestion window comprises to: determine a ratio of the number of congested packets to the total number of packets; determine a congestion estimate as a function of the ratio; and update the congestion window as a function of the congestion estimate.

Example 15 includes the subject matter of any of Examples 11-14, and wherein the metadata manager is further to: determine whether a sequence number of a received acknowledgment packet exceeds a round-trip time (RTT) window; reset the total number of packets and the number of congested packets in response to an update of the congestion window; and update the RTT window in response to a reset of the total number of packets and the number of congested packets; wherein to determine the total number of packets acknowledged comprises to determine the total number of packets acknowledged in the RTT window; wherein to determine the number of congested packets acknowledged comprises to determine the number of congested packets acknowledged in the RTT window; and wherein to update the congestion window comprises to update the congestion window in response to a determination that the sequence number exceeds the RTT window.

Example 16 includes the subject matter of any of Examples 11-15, and further comprising a congestion window increaser to: determine whether a routable RDMA acknowledgment packet acknowledges an outstanding request packet in response to the receipt of the plurality of routable RDMA acknowledgment packets; determine whether the number of congested packets acknowledged is zero in response to the receipt of the plurality of routable RDMA acknowledgment packets; and increase the congestion window in response to a determination that the routable RDMA acknowledgment packet acknowledges the outstanding request packet and a determination that the number of congested packets acknowledged in zero.

Example 17 includes the subject matter of any of Examples 11-16, and wherein to increase the congestion window comprises to: determine whether the congestion window has a predetermined relationship with a predetermined slow start threshold; increment the congestion window in a slow start mode in response to a determination that the congestion window has the predetermined relationship with the predetermined slow start threshold; and increment the congestion window in a congestion avoidance mode in response to a determination that the congestion window does not have the predetermined relationship with the predetermined slow start threshold.

Example 18 includes the subject matter of any of Examples 11-17, and wherein to increment the congestion window in the slow start mode comprises to increment the congestion window by a number of packets specified by a limit variable.

Example 19 includes the subject matter of any of Examples 11-18, and wherein to increment the congestion window in the slow start mode comprises to increment the congestion window by a number of request packets acknowledged.

Example 20 includes the subject matter of any of Examples 11-19, and wherein to increment the congestion window in the congestion avoidance mode comprises to: (i) accumulate a number of request packets acknowledged, (ii) determine whether the number of request packets acknowledged has a predetermined relationship with the congestion window, and (iii) increment the congestion window by one packet in response to a determination the number of request packets has the predetermined relationship with the congestion window.

Example 21 includes the subject matter of any of Examples 11-20, and further comprising a network controller, wherein the network controller comprises the RDMA receiver, the metadata manager, and the congestion window updater.

Example 22 includes a computing device for remote direct memory access (RDMA) congestion control, the computing device comprising: an RDMA receiver to receive a routable RDMA read request packet from a requester device over an Ethernet network, wherein the routable RDMA read request packet comprises an Internet protocol (IP) header, a stateless transport protocol header, an RDMA base transport header (BTH), and an RDMA read request payload; and an RDMA read request handler to (i) determine a transmit rate as a function of a congestion window and a round-trip time, wherein the congestion window comprises an allowed number of outstanding packets associated with the requester device, and (ii) send a plurality of routable RDMA read response packets to the requester device at the transmit rate.

Example 23 includes the subject matter of Example 22, and wherein to send the plurality of routable RDMA read response packets comprises to: determine a next transmit time as a function of the transmit rate; wait for the next transmit time; and send a first routable RDMA read response packets of the plurality of routable RDMA read response packets in response to a wait for the next transmit time.

Example 24 includes the subject matter of any of Examples 22 and 23, and wherein: to determine the next transmit time comprises to determine the next transmit time based on a current timestamp, a clock period of the computing device, and the transmit rate; and to wait for the next transmit time comprises to drop a transmit transaction if the current timestamp is less than the next transmit time, wherein the current timestamp comprises a counter variable that is incremented once per clock period.

Example 25 includes the subject matter of any of Examples 22-24, and further comprising a network controller, wherein the network controller comprises the RDMA receiver and the RDMA read request handler.

Example 26 includes a method for remote direct memory access (RDMA) congestion control, the method comprising: receiving, by a computing device, a routable RDMA packet from a requester device over an Ethernet network, wherein the routable RDMA packet comprises an Internet protocol (IP) header, a stateless transport protocol header, an RDMA base transport header (BTH), and an RDMA payload; determining, by the computing device, whether the IP header of the routable RDMA packet includes a congestion encountered code point; and sending, by the computing device, an acknowledgment packet to the requester device in response to determining that the IP header includes the congestion encountered code point, wherein the acknowledgment packet comprises a routable RDMA packet including an IP header, a stateless transport protocol header, and an RDMA BTH, and wherein an express congestion notification bit of the RDMA BTH is set.

Example 27 includes the subject matter of Example 26, and wherein: the stateless transport protocol header comprises a user datagram protocol (UDP) header; and the routable RDMA packet comprises an RDMA over converged Ethernet version 2 (RoCEv2) packet.

Example 28 includes the subject matter of any of Examples 26 and 27, and wherein the express congestion notification bit comprises a BECN bit.

Example 29 includes the subject matter of any of Examples 26-28, and further comprising sending, by the computing device, an acknowledgment packet to the requester device in response to determining that the IP header does not include the congestion encountered code point, wherein the acknowledgment packet comprises an RDMA BTH, and wherein an express congestion notification bit of the RDMA BTH is not set.

Example 30 includes the subject matter of any of Examples 26-29, and further comprising: immediately sending a second acknowledgement packet to the requester device in response to determining that the IP header includes the congestion encountered code point, wherein the second acknowledgment packet is associated with one or more unacknowledged request packets, and wherein the second acknowledgment packet comprises an RDMA BTH, and wherein an express congestion notification bit of the RDMA BTH of the second acknowledgment packet is not set; wherein sending the acknowledgment packet comprises sending the acknowledgment packet in response to immediately sending the second acknowledgment packet.

Example 31 includes the subject matter of any of Examples 26-30, and further comprising: determining, by the computing device, whether a congestion state associated with the requester device has changed in response to determining whether the IP header includes the congestion encountered code point; storing, by the computing device, an expected packet sequence number as a previous expected packet sequence number in response to determining that the congestion state has changed; and setting, by the computing device, a flag to request immediate acknowledgment of the routable RDMA packet.

Example 32 includes the subject matter of any of Examples 26-31, and wherein: receiving the routable RDMA packet comprises receiving the routable RDMA packet by a network controller of the computing device; determining whether the IP header of the routable RDMA packet includes the congestion encountered code point comprises determining whether the IP header of the routable RDMA packet includes the congestion encountered code point by the network controller; and sending, the acknowledgment packet to the requester device comprises sending the acknowledgment packet to the requester device by the network controller.

Example 33 includes the subject matter of any of Examples 26-32, and further comprising: receiving, by the computing device, a routable RDMA read request packet from the requester device over the Ethernet network, wherein the routable RDMA read request packet comprises an Internet protocol (IP) header, a stateless transport protocol header, an RDMA base transport header (BTH), and an RDMA read request payload; determining, by the computing device, a transmit rate as a function of a congestion window and a round-trip time, wherein the congestion window comprises an allowed number of outstanding packets associated with the requester device; and sending, by the computing device, a plurality of routable RDMA read response packets to the requester device at the transmit rate.

Example 34 includes the subject matter of any of Examples 26-33, and wherein sending the plurality of routable RDMA read response packets comprises: determining a next transmit time as a function of the transmit rate; waiting for the next transmit time; and sending a first routable RDMA read response packets of the plurality of routable RDMA read response packets in response to waiting for the next transmit time.

Example 35 includes the subject matter of any of Examples 26-34, and wherein: determining the next transmit time comprises determining the next transmit time based on a current timestamp, a clock period of the computing device, and the transmit rate; and waiting for the next transmit time comprises dropping a transmit transaction if the current timestamp is less than the next transmit time, wherein the current timestamp comprises a counter variable that is incremented once per clock period.

Example 36 includes a method for remote direct memory access (RDMA) congestion control, the method comprising: receiving, by a computing device, a plurality of routable RDMA acknowledgment packets from a responder device, wherein each of the routable RDMA acknowledgment packets comprises an Internet protocol (IP) header, a stateless transport protocol header, an RDMA base transport header (BTH); determining, by the computing device, a total number of packets acknowledged in response to receiving the plurality of routable RDMA acknowledgment packets; determining, by the computing device, a number of congested packets acknowledged in response to receiving the plurality of routable RDMA acknowledgment packets, wherein each of the congested packets has an express congestion notification bit of the RDMA BTH that is set; and updating, by the computing device, a congestion window as a function of the number of congested packets and the total number of packets, wherein the congestion window comprises an allowed number of outstanding request packets associated with the responder device.

Example 37 includes the subject matter of Example 36, and wherein: the stateless transport protocol header comprises a user datagram protocol (UDP) header; and each of the routable RDMA acknowledgment packets comprises an RDMA over converged Ethernet version 2 (RoCEv2) packet.

Example 38 includes the subject matter of any of Examples 36 and 37, and wherein the express congestion notification bit comprises a BECN bit.

Example 39 includes the subject matter of any of Examples 36-38, and wherein updating the congestion window comprises: determining a ratio of the number of congested packets to the total number of packets; determining a congestion estimate as a function of the ratio; and updating the congestion window as a function of the congestion estimate.

Example 40 includes the subject matter of any of Examples 36-39, and further comprising: determining, by the computing device, whether a sequence number of a received acknowledgment packet exceeds a round-trip time (RTT) window; resetting, by the computing device, the total number of packets and the number of congested packets in response to updating the congestion window; and updating, by the computing device, the RTT window in response to resetting the total number of packets and the number of congested packets; wherein determining the total number of packets acknowledged comprises determining the total number of packets acknowledged in the RTT window; wherein determining the number of congested packets acknowledged comprises determining the number of congested packets acknowledged in the RTT window; and wherein updating the congestion window comprises updating the congestion window in response to determining that the sequence number exceeds the RTT window.

Example 41 includes the subject matter of any of Examples 36-40, and further comprising: determining, by the computing device, whether a routable RDMA acknowledgment packet acknowledges an outstanding request packet in response to receiving the plurality of routable RDMA acknowledgment packets; determining, by the computing device, whether the number of congested packets acknowledged is zero in response to receiving the plurality of routable RDMA acknowledgment packets; and increasing, by the computing device, the congestion window in response to determining that the routable RDMA acknowledgment packet acknowledges the outstanding request packet and determining that the number of congested packets acknowledged in zero.

Example 42 includes the subject matter of any of Examples 36-41, and wherein increasing the congestion window comprises: determining, by the computing device, whether the congestion window has a predetermined relationship with a predetermined slow start threshold; incrementing the congestion window in a slow start mode in response to determining that the congestion window has the predetermined relationship with the predetermined slow start threshold; and incrementing the congestion window in a congestion avoidance mode in response to determining that the congestion window does not have the predetermined relationship with the predetermined slow start threshold.

Example 43 includes the subject matter of any of Examples 36-42, and wherein incrementing the congestion window in the slow start mode comprises incrementing the congestion window by a number of packets specified by a limit variable.

Example 44 includes the subject matter of any of Examples 36-43, and wherein incrementing the congestion window in the slow start mode comprises incrementing the congestion window by a number of request packets acknowledged.

Example 45 includes the subject matter of any of Examples 36-44, and wherein incrementing the congestion window in the congestion avoidance mode comprises: (i) accumulating a number of request packets acknowledged, (ii) determining whether the number of request packets acknowledged has a predetermined relationship with the congestion window, and (iii) incrementing the congestion window by one packet in response to determining the number of request packets has the predetermined relationship with the congestion window.

Example 46 includes the subject matter of any of Examples 36-45, and wherein: receiving the plurality of routable RDMA acknowledgment packets comprises receiving the plurality of routable RDMA acknowledgment packets by a network controller of the computing device; determining the total number of packets comprises determining the total number of packets by the network controller; determining the number of congested packets comprises determining the number of congested packets by the network controller; and updating the congestion window comprises updating the congestion window by the network controller.

Example 47 includes a method for remote direct memory access (RDMA) congestion control, the method comprising: receiving, by a computing device, a routable RDMA read request packet from a requester device over an Ethernet network, wherein the routable RDMA read request packet comprises an Internet protocol (IP) header, a stateless transport protocol header, an RDMA base transport header (BTH), and an RDMA read request payload; determining, by the computing device, a transmit rate as a function of a congestion window and a round-trip time, wherein the congestion window comprises an allowed number of outstanding packets associated with the requester device; and sending, by the computing device, a plurality of routable RDMA read response packets to the requester device at the transmit rate.

Example 48 includes the subject matter of Example 47, and wherein sending the plurality of routable RDMA read response packets comprises: determining a next transmit time as a function of the transmit rate; waiting for the next transmit time; and sending a first routable RDMA read response packets of the plurality of routable RDMA read response packets in response to waiting for the next transmit time.

Example 49 includes the subject matter of any of Examples 47 and 48, and wherein: determining the next transmit time comprises determining the next transmit time based on a current timestamp, a clock period of the computing device, and the transmit rate; and waiting for the next transmit time comprises dropping a transmit transaction if the current timestamp is less than the next transmit time, wherein the current timestamp comprises a counter variable that is incremented once per clock period.

Example 50 includes the subject matter of any of Examples 47-49, and wherein: receiving the routable RDMA read request comprises receiving the routable RDMA read request by a network controller of the computing device; determining the transmit rate comprises determining the transmit rate by the network controller; and sending the plurality of routable RDMA read response packets comprises sending the plurality of routable RDMA read response packets by the network controller.

Example 51 includes a computing device comprising: a processor; and a memory having stored therein a plurality of instructions that when executed by the processor cause the computing device to perform the method of any of Examples 26-50.

Example 52 includes one or more non-transitory, computer readable storage media comprising a plurality of instructions stored thereon that in response to being executed result in a computing device performing the method of any of Examples 26-50.

Example 53 includes a computing device comprising means for performing the method of any of Examples 26-50.

The invention claimed is:

1. A computing device comprising:
 circuitry to:
  receive a routable remote direct memory access (RDMA) packet from a requester device over an Ethernet network, the routable RDMA packet to include an Internet protocol (IP) header, a stateless transport protocol header, an RDMA base transport header (BTH), and an RDMA payload;
  determine that the IP header of the routable RDMA packet includes a congestion encountered code point to indicate that the routable RDMA packet is a congested packet; and
  send a congestion acknowledgment packet to the requester device, the congestion acknowledgment packet to include a routable RDMA packet that includes an IP header, a stateless transport protocol header, and an RDMA BTH having an express congestion notification bit that is set, wherein the requester device is to use the congestion acknowledgment packet to update a congestion window based on a proportion of received congestion acknowledgment packets versus a total number of packets acknowledged, wherein the congestion window indicates an allowed number of outstanding, unacknowledged packets by the circuitry that are transmitted by the requester device over the Ethernet network.

2. The computing device of claim 1, wherein:
 the stateless transport protocol header is a user datagram protocol (UDP) header;
 the routable RDMA packet is an RDMA over converged Ethernet version 2 (RoCEv2) packet; and
 the express congestion notification bit is a backward explicit congestion notification (BECN) bit.

3. The computing device of claim 1, further comprising the circuitry to:
 immediately send another acknowledgement packet to the requester device in response to the determination that the IP header includes the congestion encountered code point, wherein the other acknowledgment packet is associated with one or more unacknowledged packets by the circuitry that are transmitted by the requester device over the Ethernet network, and wherein the other acknowledgment packet comprises an RDMA BTH, and wherein an express congestion notification bit of the RDMA BTH of the other acknowledgment packet is not set, wherein to send the congestion acknowledgment packet is to include sending the congestion acknowledgment packet in response to an immediate sending of the other acknowledgment packet.

4. The computing device of claim 1, further comprising the circuitry to:
 determine whether a congestion state associated with the requester device has changed in response to the determination that the IP header includes the congestion encountered code point;
 store an expected packet sequence number as a previous expected packet sequence number in response to a determination that the congestion state has changed; and
 set a flag to request immediate acknowledgment of the routable RDMA packet.

5. The computing device of claim 1, wherein the computing device comprises a network controller.

6. The computing device of claim 1, further comprising the circuitry to:
 receive a routable RDMA read request packet from the requester device over the Ethernet network, the routable RDMA read request packet to include an IP header, a stateless transport protocol header, an RDMA BTH, and an RDMA read request payload; and determine a transmit rate as a function of the updated congestion window and a round-trip time; and send a plurality of routable RDMA read response packets to the requester device at the transmit rate.

7. The computing device of claim 6, wherein to send the plurality of routable RDMA read response packets comprises the circuitry to:

determine a next transmit time as a function of the transmit rate;

wait for the next transmit time; and send a first routable RDMA read response packets of the plurality of routable RDMA read response packets in response to a wait for the next transmit time.

8. One or more non-transitory computer-readable storage media comprising a plurality of instructions stored thereon that, in response to being executed, cause a computing device to:

receive a routable remote direct memory access (RDMA) packet from a requester device over an Ethernet network, the routable RDMA packet to include an Internet protocol (IP) header, a stateless transport protocol header, an RDMA base transport header (BTH), and an RDMA payload;

determine that the IP header of the routable RDMA packet includes a congestion encountered code point to indicate that the routable RDMA packet is a congested packet; and send a congestion acknowledgment packet to the requester device, the congestion acknowledgment packet to include a routable RDMA packet that includes an IP header, a stateless transport protocol header, and an RDMA BTH having an express congestion notification bit that is set, wherein the requester device is to use the congestion acknowledgment packet to update a congestion window based on a proportion of received congestion acknowledgment packets versus a total number of packets acknowledged, wherein the congestion window indicates an allowed number of outstanding, unacknowledged packets by the computing device that are transmitted by the requester device over the Ethernet network.

9. The one or more non-transitory computer-readable storage media of claim 8, further comprising a plurality of instructions stored thereon that, in response to being executed, cause the computing device to:

immediately send another acknowledgement packet to the requester device in response to the determination that the IP header includes the congestion encountered code point, wherein the other acknowledgment packet is associated with one or more unacknowledged packets by the computing device that are transmitted by the requester device over the Ethernet network, and wherein the other acknowledgment packet comprises an RDMA BTH, and wherein an express congestion notification bit of the RDMA BTH of the other acknowledgment packet is not set, wherein to send the congestion acknowledgment packet is to include sending the congestion acknowledgment packet in response to an immediate sending of the other acknowledgment packet.

10. The one or more non-transitory computer-readable storage media of claim 8, wherein:

to receive the routable RDMA packet includes receiving the routable RDMA packet by circuitry of a network controller of the computing device;

to determine that the IP header of the routable RDMA packet includes the congestion encountered code point includes determining that the IP header of the routable RDMA packet includes the congestion encountered code point by the circuitry of the network controller; and to send the congestion acknowledgment packet to the requester device includes sending the congestion acknowledgment packet to the requester device by the circuitry of the network controller.

11. The one or more non-transitory computer-readable storage media of claim 8, further comprising a plurality of instructions stored thereon that, in response to being executed, cause the computing device to:

receive a routable RDMA read request packet from the requester device over the Ethernet network, the routable RDMA read request packet to include an IP header, a stateless transport protocol header, an RDMA BTH, and an RDMA read request payload;

determine a transmit rate as a function of the updated congestion window and a round-trip time; and send a plurality of routable RDMA read response packets to the requester device at the transmit rate.

12. A computing device comprising:

circuitry to:

receive a plurality of routable remote direct memory access (RDMA) acknowledgment packets from a responder device, each of the routable RDMA acknowledgment packets to include an Internet protocol (IP) header, a stateless transport protocol header, an RDMA base transport header (BTH);

determine a total number of packets acknowledged in response to receipt of the plurality of routable RDMA acknowledgment packets;

determine a number of congested packets acknowledged in response to the receipt of the plurality of routable RDMA acknowledgment packets, each of the congested packets to have an express congestion notification bit of the RDMA BTH that is set; and update a congestion window based on a proportion of the number of congested packets versus the total number of packets, wherein the congestion window indicates an allowed number of outstanding, unacknowledged packets transmitted to the responder device.

13. The computing device of claim 12, wherein to update the congestion window further comprises the circuitry to:

determine a congestion estimate as a function of the proportion of the number of congested packets versus the total number of packets; and update the congestion window as a function of the congestion estimate.

14. The computing device of claim 12, wherein the circuitry is further to:

determine whether a sequence number of a received acknowledgment packet exceeds a round-trip time (RTT) window;

reset the total number of packets and the number of congested packets in response to an update of the congestion window; and update the RTT window in response to a reset of the total number of packets and the number of congested packets;

wherein to determine the total number of packets acknowledged comprises to determine the total number of packets acknowledged in the RTT window;

wherein to determine the number of congested packets acknowledged comprises to determine the number of congested packets acknowledged in the RTT window; and wherein to update the congestion window includes updating the congestion window in response to a determination that the sequence number exceeds the RTT window.

15. The computing device of claim 12, further comprising the circuitry to:
determine whether a routable RDMA acknowledgment packet acknowledges an outstanding request packet in response to the receipt of the plurality of routable RDMA acknowledgment packets;
determine whether the number of congested packets acknowledged is zero in response to the receipt of the plurality of routable RDMA acknowledgment packets; and
increase the congestion window in response to a determination that the routable RDMA acknowledgment packet acknowledges the outstanding request packet and a determination that the number of congested packets acknowledged is zero, wherein to increase the congestion window comprises to:
determine whether the congestion window has a predetermined relationship with a predetermined slow start threshold;
increment the congestion window in a slow start mode in response to a determination that the congestion window has the predetermined relationship with the predetermined slow start threshold; and
increment the congestion window in a congestion avoidance mode in response to a determination that the congestion window does not have the predetermined relationship with the predetermined slow start threshold.

16. The computing device of claim 15, wherein to increment the congestion window in the slow start mode comprises to increment the congestion window by a number of packets specified by a limit variable.

17. The computing device of claim 16, wherein to increment the congestion window in the slow start mode comprises to increment the congestion window by a number of request packets acknowledged.

18. The computing device of claim 15, wherein to increment the congestion window in the congestion avoidance mode comprises to: (i) accumulate a number of request packets acknowledged, (ii) determine whether the number of request packets acknowledged has a predetermined relationship with the congestion window, and (iii) increment the congestion window by one packet in response to a determination the number of request packets has the predetermined relationship with the congestion window.

19. The computing device of claim 12, comprising the circuitry included in a network controller.

20. One or more non-transitory computer-readable storage media comprising a plurality of instructions stored thereon that, in response to being executed, cause a computing device to:
receive a plurality of routable remote direct memory access (RDMA) acknowledgment packets from a responder device, each of the routable RDMA acknowledgment packets to include an Internet protocol (IP) header, a stateless transport protocol header, an RDMA base transport header (BTH);
determine a total number of packets acknowledged in response to receiving the plurality of routable RDMA acknowledgment packets;
determine a number of congested packets acknowledged in response to receiving the plurality of routable RDMA acknowledgment packets, each of the congested packets to have an express congestion notification bit of the RDMA BTH that is set; and
update a congestion window based on a proportion of the number of congested packets versus the total number of packets, wherein the congestion window indicates an allowed number of outstanding, unacknowledged packets transmitted to the responder device.

21. The one or more non-transitory computer-readable storage media of claim 20, wherein to update the congestion window comprises to:
determine a congestion estimate as a function of the proportion of the number of congested packets versus the total number of packets; and
update the congestion window as a function of the congestion estimate.

22. The one or more non-transitory computer-readable storage media of claim 20, further comprising a plurality of instructions stored thereon that, in response to being executed, cause the computing device to:
determine whether a routable RDMA acknowledgment packet acknowledges an outstanding packet in response to receiving the plurality of routable RDMA acknowledgment packets;
determine whether the number of congested packets acknowledged is zero in response to receiving the plurality of routable RDMA acknowledgment packets; and
increase the congestion window in response to determining that the routable RDMA acknowledgment packet acknowledges the outstanding packet and determining that the number of congested packets acknowledged is zero.

23. The one or more non-transitory computer-readable storage media of claim 20, wherein:
to receive the plurality of routable RDMA acknowledgment packets comprises to receive the plurality of routable RDMA acknowledgment packets by a network controller of the computing device;
to determine the total number of packets comprises to determine the total number of packets by the network controller;
to determine the number of congested packets comprises to determine the number of congested packets by the network controller; and
to update the congestion window comprises to update the congestion window by the network controller.

* * * * *